UNITED STATES PATENT OFFICE.

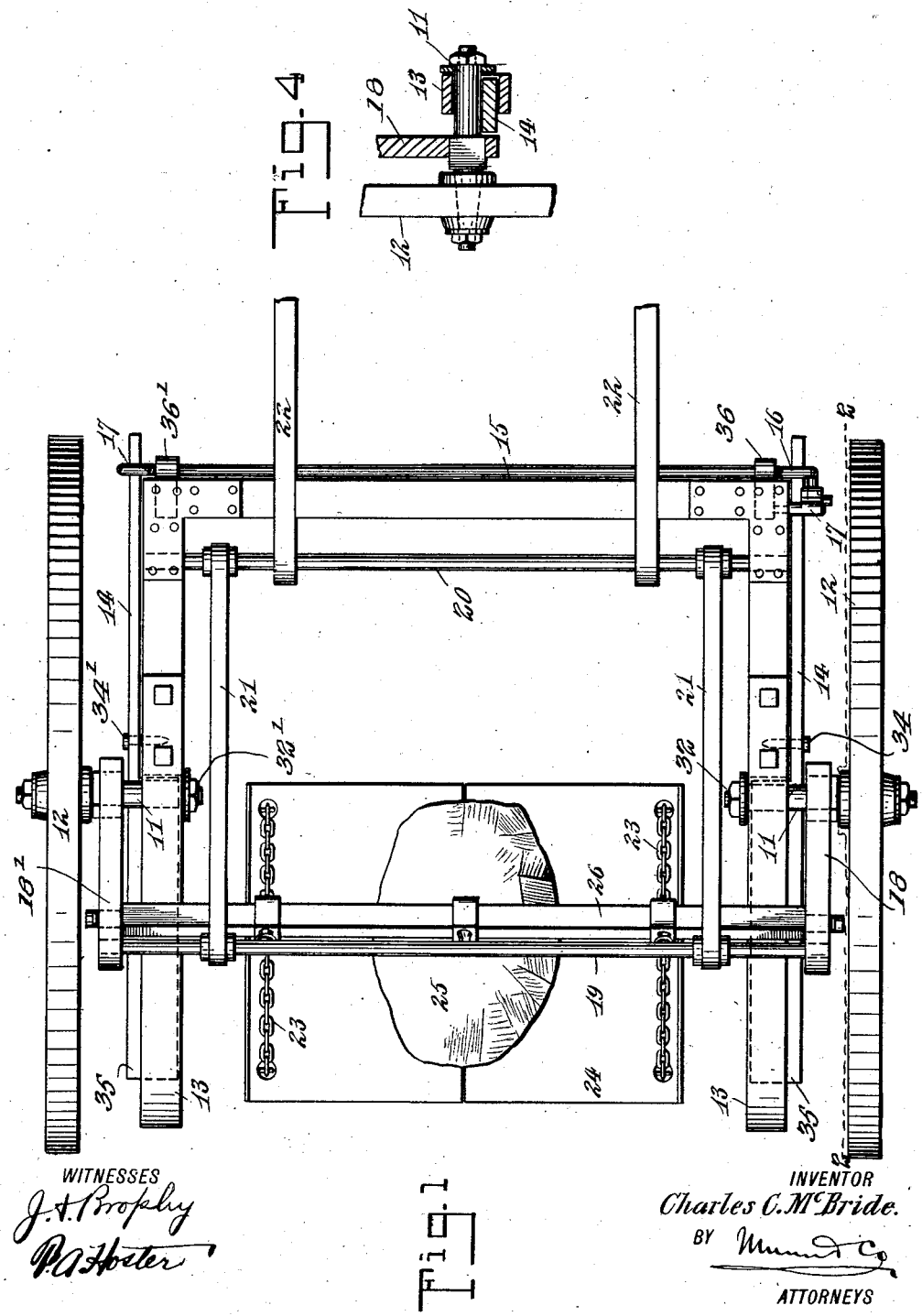

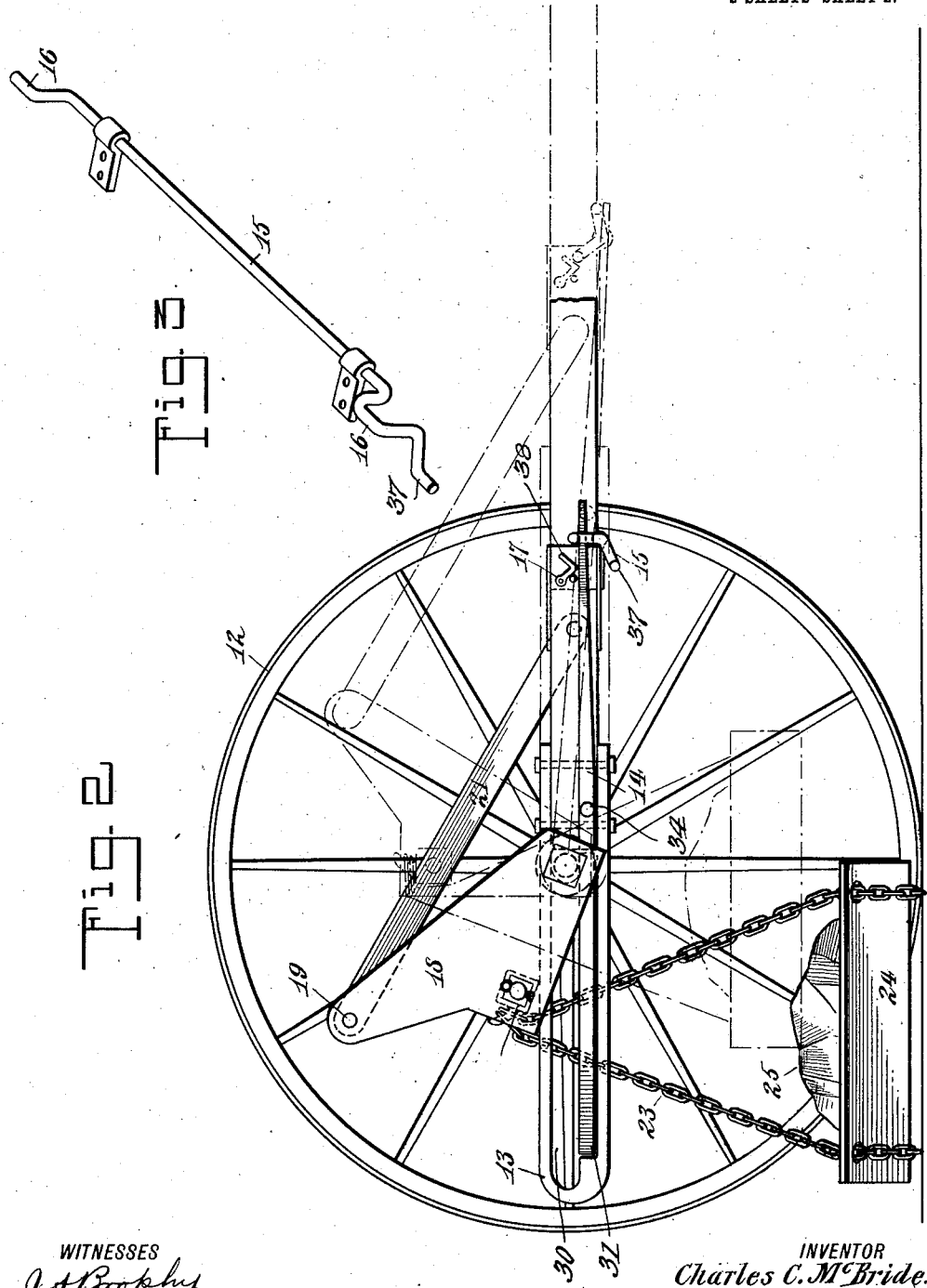

CHARLES C. McBRIDE, OF BISBEE, ARIZONA, ASSIGNOR OF ONE-HALF TO JAMES MILTON SPARKS, OF BISBEE, ARIZONA.

STONE-TRUCK.

1,023,024.

Specification of Letters Patent.

Patented Apr. 9, 1912.

Application filed November 22, 1910. Serial No. 593,633.

*To all whom it may concern:*

Be it known that I, CHARLES C. McBRIDE, a citizen of the United States, and a resident of Bisbee, in the county of Cochise and State of Arizona, have invented a new and Improved Stone-Truck, of which the following is a full, clear, and exact description.

My invention relates generally to stone trucks and more particularly it involves a truck of peculiar construction whereby the stone to be transported may be raised from the ground by movement of some elements carried by the truck previous to transportation.

The object of my invention is to provide a truck of the class described by which the stones to be raised from the ground and moved to a distance may be so raised and moved by movement of the animal hitched to the truck.

Reference is to be had to the accompanying drawings forming a part of this specification, in which similar characters of reference denote corresponding parts in all the views, and in which—

Figure 1 is a plan view of my truck; Fig. 2 is a side view, partly in section, on the line 2—2 of Fig. 1; Fig. 3 is a perspective view of the rod which holds the locking bar in position; Fig. 4 is a fragmentary sectional view disclosing the locking bar constituting a bearing surface for the axle stud.

For the purpose mentioned the truck is made up of a main frame 13 of U-shaped construction, to one end of which a pair of shafts 22 are attached whereby a horse may be hitched to the truck.

As shown particularly in Fig. 2, each of the side members of the main frame is provided with a slot 30 extending for a suitable distance in the side members, each of these slots being of the peculiar conformation shown in the said figure, the slot being of greater width throughout the greater portion of its length but of narrower width from the shoulder 31 to the outer end thereof.

A pair of wheels 12 suitably mounted on axles 11, the inner ends of which are provided with nuts 32, 32', form the supporting means for the main frame, each of the said axles 11 engaging at its inner ends in one of the slots 30, the said axles being capable of movement within these slots.

Pivotally secured on each of the axles 11 between the main frame 13 and each of the wheels 12 is a second frame of substantially U-shaped construction, the end portions 18, 18' having openings adjacent their rear ends for engagement on the said axles and the other member 19 of the frame extending across and above the main frame 13.

Rigidly secured between the side members of the main frame 13 and adjacent its forward end is a cross bar 20 having arms 21 extending toward the rear of the main frame and pivotally engaging the member 19 of the said second frame.

Rigidly engaged by each of the end portions 18, 18', and extending across the main frame 13 is a supporting bar 26 having a plurality of chains 23 depending therefrom, these chains being in engagement with a stone board 24 upon which the stone 25 to be moved is placed.

From what has been set forth it will be seen that if my truck is placed with the parts thereof in the position shown in Fig. 2 forward movement of the animal hitched to the shafts 22 will bring the main frame 13 in a relatively forward position with the axles 11 at the outer ends of the slots 30 in the said main frame 13; if the stone 25 has been placed on the stone board 24 previous to the above-mentioned movement of the animal, the final position of the stone is as shown in dotted lines in Fig. 2, since the travel of the main frame with respect to the axles 11 has raised the supporting bar 26 the final position of this bar with the stone board depending therefrom being higher than the initial position whereby the stone has been raised from the ground.

As a means for holding the axles 11 locked at the outer ends of the slots 30 I employ a locking bar 14 at each side of the main frame 13 and pivoted thereto at 34, 34', the rear end portions 35 of the locking bars extending within the slots 30 in the main frame and the thickness of the bars being substantially equal to the height of the shoulder 31 adjacent the rear end of the main frame whereby the axles are permitted to travel during movement of the main frame, the final position of the axles being at the extreme outer end of the slots and beyond the said shoulders 31. With the axles in this position the front ends of the locking bars 14 are moved downwardly thereby bringing the rear ends upwardly and above the shoulders 31 and closely adjacent to the axles 11 whereby these axles are held against forward movement in the slots 30 during further movement of the truck. Suitable means are employed for moving the said locking bars and other means are employed for holding the locking bars in their moved position, the said means being preferably carried by the main frame 13 and adjacent the front end thereof. A rod 15 having angularly extending end portions 16 (as shown in Fig. 3) is suitably supported in bearings 36, 36′, carried by the main frame 13, the said rod being capable of rotation within these bearings. As shown in full lines in Figs. 2 and 3, one end of the bar 15 is provided with an offset handle portion 37; the front ends of the locking bars 14, lie adjacent the end portions of the rod 15 and by turning the handle portion 37 the ends 16 of the rod 15 may be brought into engagement with the said ends of the locking bars whereby the rear ends thereof are raised. As a means of insuring the relation of the parts when the rear ends of the locking bars are raised I employ a catch 17 carried by the said main frame 13, the outer end 38 of this catch being adapted to abut the handle portion 37 of the rod 15 whereby the relation of the parts is maintained as shown in dotted lines in Fig. 2.

When it is desired to use my truck, the various parts thereof are brought to the position shown in Fig. 2 and the stone 25 is placed on the stone board 24; the animal is then driven forwardly whereby the frame 13 will move relatively to the wheels 12 and the stone will be elevated from the ground as previously explained. With the stone in this elevated position the locking bars 14 are swung about their pivotal supports 34, 34′ thereby holding the axles 11 securely in the rear ends of the slots 30 and the locking bars are maintained in such a position by bringing the end 38 of the catch 17 into engagement with the handle end 37 of the shaft 15. The truck, with the stone in position thereon, is now ready to be moved from place to place. When it is desired to remove the stone or boulder 25 from the stone board 24, the opposite procedure may be gone through in order to bring the axles 11 into position in the front ends of the slots 30, as shown in Fig. 2, or the stone may be moved by any suitable means from the stone board.

While it is obvious that in the drawings I have shown the preferred form of my device, it will be seen that the same is capable of many modifications as to size, shape, and relation of the various parts, and that such modifications do not involve a departure from the spirit of the invention as set forth in the following claims.

Having thus described my invention, I claim as new, and desire to secure by Letters Patent:—

1. A stone truck comprising a main frame, slots in opposite sides thereof, axles in the slots, wheels on the axles, a second frame in pivotal engagement with the said axles, a stone board carried by the said second frame, and means engaging the main frame and the second frame whereby, as the main frame is moved relatively to the second frame, the stone board will be elevated from the ground.

2. A stone truck comprising a main frame, axles carried at opposite sides thereof, wheels on the axles, the said axles being movable longitudinally of the said main frame, a second frame having one portion thereof connected to the said main frame and another portion thereof in engagement with the said axles, together with a stone board carried by the said second frame whereby as the main frame is moved relatively to the second frame, the said second frame and the stone board carried thereby will be elevated from the ground.

3. A stone truck comprising a U-shaped frame having slots at opposite sides thereof, axles mounted in the said slots and wheels carried on the axles, a second frame made up of parts which are engaged by the said main frame and the said axles, the said parts being movable relatively one to the other, a stone board carried on the said second frame whereby as the main frame is moved relatively to the second frame, the said axles will abut the ends of the said slots, and the said stone board will be elevated from the ground.

4. A stone truck comprising a main frame having slots at opposite sides thereof, axles carried in the said slots and movable therein, wheels on the said axles, a second frame having end portions pivotally engaged by the said axles, arms extending between the said second frame and the said main frame, a stone board carried by the said second frame whereby as the main frame is moved relatively to the second frame the said axles will engage the said slots at the outer end thereof, thereby carrying the said second frame and with it the stone board to an elevated position.

5. A stone truck comprising a main frame of U-shaped construction, a pair of shafts at one end thereof, the opposite sides of the said main frame being provided with slots, axles movably carried in the said slots, wheels on the axles, a second frame having a movable end portion in engagement with the axles, a member carried by the said end portion and having a stone board supported therefrom, arms in pivotal engagement with the said main frame, the other ends of the arms being in pivotal engagement with the said end portion whereby as the main frame is moved relatively to the said second frame, the said axles will be moved in the slots and the said movable end portion of the second frame and the stone board supported therefrom will be elevated.

6. A stone truck comprising a main frame, axles carried at opposite sides thereof and movable therein, wheels on the axles, a second frame having end portions pivotally engaging the said axles, a member extending between the said end portions and having a stone board supported therefrom, arms extending between the said main frame and the said second frame whereby, when the main frame is moved relatively to the second frame, the stone board will be elevated, together with means for locking the said axles in their final position after movement.

7. A stone truck comprising a main frame of U-shaped construction having slots in opposite portions thereof, axles carried by the said frame in the said slots, wheels on the axles, a second frame comprising end members pivotally supported on the said axles, a transverse bar carried by the said second frame and having a stone board depending therefrom, a plurality of arms, one end of each arm being pivotally supported by the said main frame and the other end of each arm being pivotally supported by the said second frame whereby, as the main frame is moved relatively to the said second frame, the said second frame with the stone board carried thereon will be elevated from the ground, together with a locking means for maintaining the final relative positions of the main frame and the axles and comprising pivoted locking bars carried by the said main frame, one end of each of the said bars being adapted for engagement with one of the said axles, and a rod pivotally supported by the said main frame having portions thereof for engagement with the end portions of the said locking bars.

8. A stone truck comprising a U-shaped frame having slots at opposite sides thereof, axles mounted in the said slots and wheels carried on the axles, a second frame made up of parts movable relatively to each other, one of which is engaged by the said main frame and the other of which is in engagement with the said axles, together with a stone board carried on the said second frame.

9. A stone truck comprising a main frame, axles carried thereon at opposite sides thereof, wheels on the axles, a second frame having one portion thereof connected to the said main frame, and another portion thereof in engagement with the said axles, together with a stone board carried by the said second frame.

In testimony whereof I have signed my name to this specification in the presence of two subscribing witnesses.

CHARLES C. McBRIDE.

Witnesses:
ROBT. COUGHRAN,
GEORGE V. BELL.

---

Copies of this patent may be obtained for five cents each, by addressing the "Commissioner of Patents, Washington, D. C."